Nov. 16, 1948.　　　J. L. GALLAGHER　　　2,453,705
FIRST AID PRESSURE DRESSING
Filed June 30, 1944　　　2 Sheets-Sheet 1
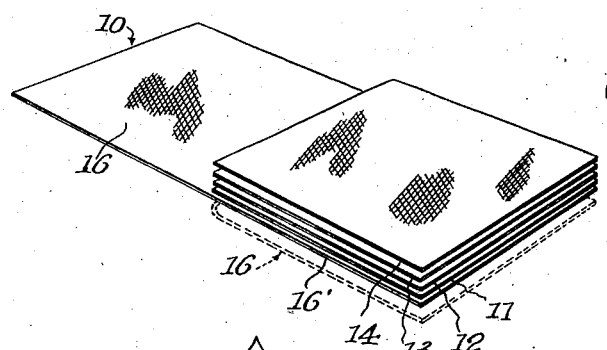
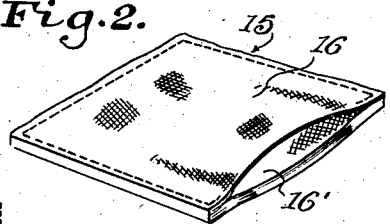
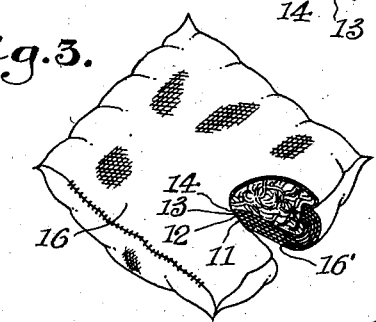
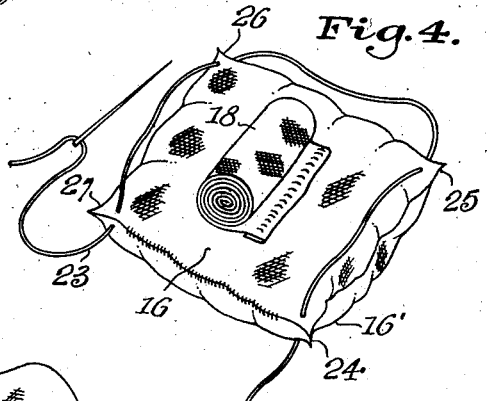
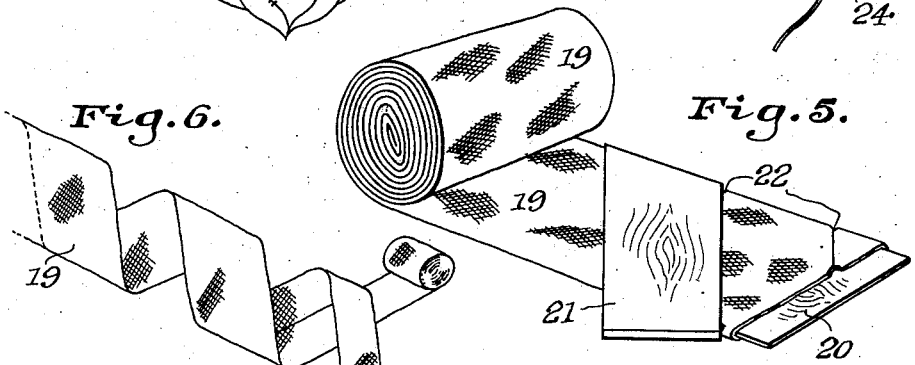
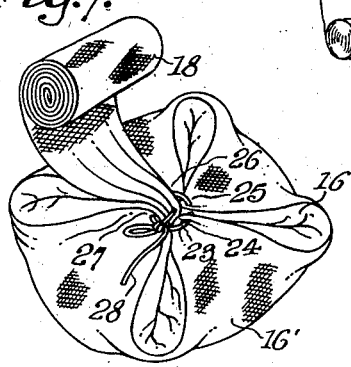
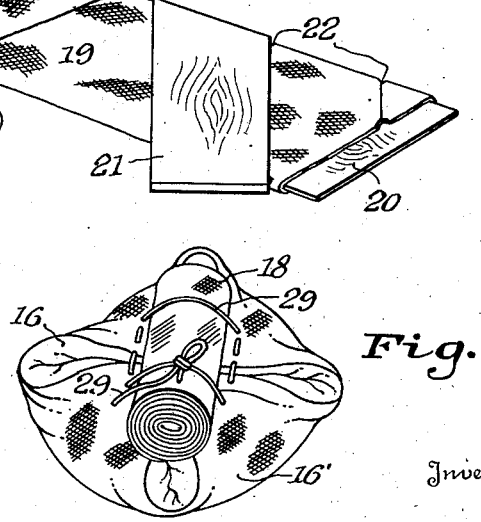
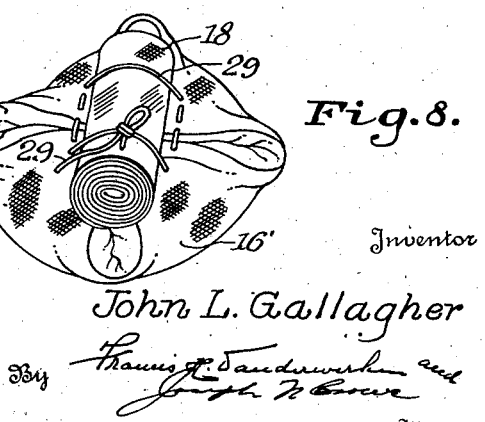
Inventor
John L. Gallagher
Attorneys Nov. 16, 1948.  J. L. GALLAGHER  2,453,705
FIRST AID PRESSURE DRESSING
Filed June 30, 1944  2 Sheets-Sheet 2

Inventor
John L. Gallagher
By
Attorneys

Patented Nov. 16, 1948

2,453,705

UNITED STATES PATENT OFFICE 2,453,705

FIRST-AID PRESSURE DRESSING

John L. Gallagher, United States Army, Santa Ana, Calif.

Application June 30, 1944, Serial No. 542,996

3 Claims. (Cl. 128—156)

(Granted under the act of March 3, 1883, as amended April 30, 1928; 370 O. G. 757)

The invention described herein may be manufactured and used by or for the Government for governmental purposes, without payment to me of any royalty thereon.

This invention relates to surgical dressings, but more particularly it is directed to a deep resilient pressure dressing operatively combined with a roll of bandage for controlling hemorrhage or for other purposes and is an improvement in the dressing set forth in pending application Serial No. 437,927, filed April 7, 1942, and which has become abandoned.

One object of the invention is to provide a dressing which may be transported to the place of the injury and applied thereto in a thoroughly aseptic condition so as to alleviate all fear of infection when dressing the wound.

Another object of the invention is to provide a dressing which may be applied with sufficient pressure to stop the hemorrhage without depriving the injured area of its natural circulation.

Another object of the invention is to provide a deep, resilient, pressure dressing which will practically eliminate edema in post-operative wounds and greatly lessen suture cutting and hematoma formation so that the period of healing will be materially shortened.

A further object of the invention is to provide a dressing which may be readily changed in size and thickness to accommodate it to the type of wound to which it is to be applied.

Another object of the invention is to provide a dressing which may be made from readily obtainable material.

Referring to the drawings in which like numerals refer to similar parts:

Figure 1 is a perspective showing the superimposed layers of cloth comprising the dressing envelope;

Figure 2 is a perspective of the envelope showing opening for insertion of padding material;

Figure 3 is a perspective view broken away to show sections of the layers of gauze constituting the cover sheets and the absorbing layers;

Figure 4 is a perspective of the filled dressing envelope with bandage attached and drawstring passed through corners;

Figure 5 is a perspective showing a stockinet and boards used for laying off bandage strips;

Figure 6 is a perspective showing a bandage strip cut on the bias;

Figure 7 is a perspective of the completed dressing with bandage attached showing the corners retained centrally by a drawstring;

Figure 8 is a perspective of the dressing with rolled bandage tied across its upper surface;

Figure 9:
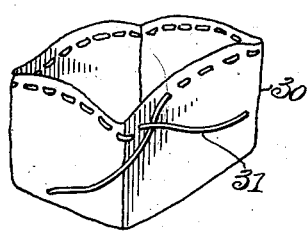
Figure 9 is a perspective view of a container for the dressings.

The bandage may be constructed by using an oblong cover piece about 10″ x 20″ as designated by the numeral 10, Fig. 1, cut from 44—40 or 36 x 44 mesh gauze and for a small dressing a cover piece measuring 7½″ x 15″ or any other dimension suitable for the purpose. Assuming that it is desired to make the large size bandage the oblong cover piece 10 is laid on a table, and four thicknesses of coarse gauze 10″ x 10″, as designated by numerals 11, 12, 13 and 14, are laid squarely on half of the oblong, designated by the numeral 10. The uncovered half 16 of the oblong is then folded under to form a square as shown in Fig. 2.

By the use of a sewing machine the square is stitched around about ½″ from its edge, leaving a 5″ slit for the insertion of padding material. In making the small 7½″ x 7½″ dressing a 3″ slit is left for the insertion of padding material.

After the oblong cover piece is stitched around the edge to form an envelope 15 similar to a pillow cover, the casing formed is turned inside out between the two layers 16 and 16′, thus producing an envelope with five thicknesses of wound contact surface including the front panel 16′ as shown in Fig. 3. Ten ounces of mechanics waste is then fluffed out, cutting the difficult tangles, and the same is stuffed into the envelope through the five-inch opening. For the small size pad 4½ ounces is used. The slit is then closed by sewing, using a whip stitch as shown in Fig. 3.

To the side of the envelope or rear panel 16 which is formed by one-half of the oblong 10 and which has a single thickness, a bias cut bandage 18 is attached by sewing either one end or the middle thereof with whip stitches.

This bandage 18 may be obtained from material which is woven in a tubular stockinet form, as indicated by the numeral 19 in Fig. 5, by inserting a smooth board 20 within the stockinet and cutting the material diagonally across the board to form a spiral, as shown in Figs. 5 and 6. For the large size bandage a 9" tubular stockinet 19 is used and an 8½" x 18½" x ¼" board 20 is inserted within the stockinet. A second board 10" x 18" cut on a 45° angle and indicated by the numeral 21, is used for marking the stockinet. This board 21 is laid with its 45° edge parallel to a longitudinal edge of the board 20 within the stockinet and notches 22 are cut in the stockinet to indicate the lines for the diagonal cuts.

In cutting the diagonals to form the bandage strips the roll of stockinet material with board inserted is turned over as the board which has been inserted therein is slid along. The bandage 18 which is 5" wide is cut in 5 yd. lengths.

After stuffing the envelope with waste a long needle is used to draw a strong black string 23 through the corners thereof. The thread is started from the five layer side, and passed through the corners, in one, out the next, never crossing an edge.

The corners 24, 25, 26 and 27 are then folded and tied firmly with a single knot, then a single bow knot, the pull end 28 of which is left 2" long, the other end ¼" long.

The bandage 18 which projects through the opening at the juncture of the corners is then rolled all the way down to the envelope and attached thereto by sewing with string 29 to the folded envelope as shown in Fig. 8. The thread 29 is passed through the folded pillow parallel to the bandage, emerging 1" from the end thereof. The thread 29 is then passed across the bandage and passed through the pillow in the reverse direction on the other side of the bandage and parallel thereto, terminating the stitching 1" from the other end of the bandage. The thread 29 is tied over the bandage 18 as shown in Fig. 8.

Figure 10:
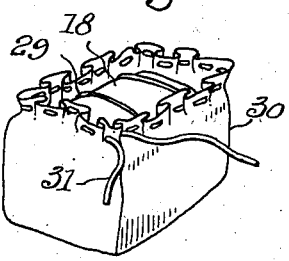
Figure 10 is a perspective view of the container partially closed around a bandage.
Figure 11:
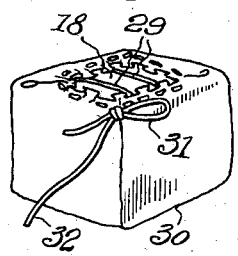
Figure 11 is a perspective view showing the container in closed position.

The dressing may be wrapped in a cover which may be sealed by ordinary adhesives, or the dressing may be placed in a cloth compression bag 30 as shown in Fig. 9. The compression bag 30 is made of just sufficient size to hold the dressing in maximum compression, which is obtained by forcing the dressing into the bag while it is in a mold, being treated as in the manner represented in Figs. 9, 10 and 11 with compression machinery to obtain the maximum compression. The drawstring 31 which is woven in and out around the neck of the bag is pulled tight and tied with the same type of knot as previously described and the pull end 32 left long.

Figure 12:
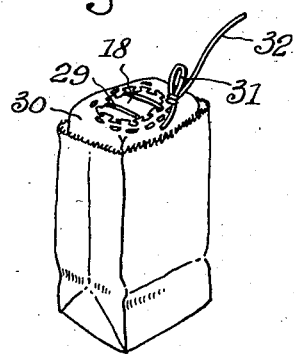
Figure 12 is a perspective view of an outer container with bandage in place therein.
Figure 13:
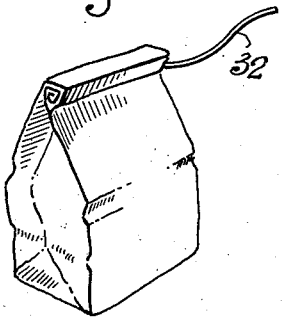
Figure 13 is a perspective view of an outer container with folded mouthpiece.
Figure 14:
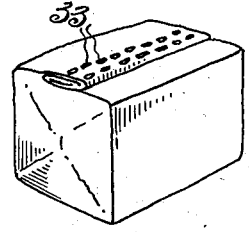
Figure 14 is a perspective view of a closed outer container showing stitching across folded mouthpiece.

The packaged dressing is then placed in a paper covering as illustrated in Figs. 12, 13 and 14 and the long pull string 32 is anchored into the stitches used to close the bag.

The paper bags shown in Figs. 12, 13 and 14 are either plicated paper or multiple bags, one inside the other. The mouth of the dressing containing bag is flattened out, folded over, and a stream of stitching 33, using an ordinary sewing machine, is drawn across the folded mouth of the bag from end to end, using no glue or other sealing material. The perforations made by the sewing machine needle and ineffectively filled by the thread do not cause concern since they are cared for in a later process. The thus incased dressing, when adequately sterilized, is taken from the sterilizer by grasping the folded over end of the bag by a sponge forceps and dipped into melted paraffin up almost to the stitch line, and is lifted out and permitted to cool briefly. The body of the bag is then grasped in the two hands, inverted and compressed to squeeze the maximum amount of air from the bag and its contents. The top portion, containing seam with perforations, is then immersed into the melted paraffin and the pressure is released creating a partial vacuum in the bag and resulting in the paraffin being drawn in to effectively seal the perforations, and thus result in a partial vacuum remaining in the bag. The vacuum thus created causes the covering to collapse snugly against the dressing and thus provides a visual proof that the contents have remained protected by an impervious covering which has held a vacuum since sterilization, permitting the user to know at a glance that air moisture, etc., has not entered to result in contamination. A second test for imperviousness, definite negative pressure—compress the edges to cause sides to slightly bulge, release to see and feel sides snap back.

Figures 15, 16:
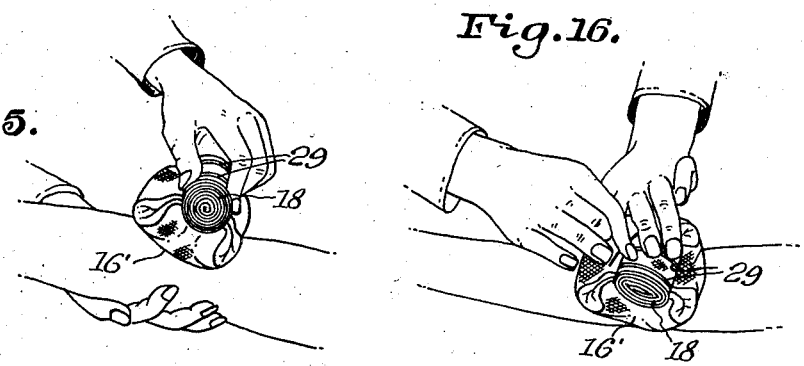
Figure 15 is a perspective view showing manner of applying the pressure dressing to the wound.
Figure 16 is a perspective view showing manner in which pressure dressing is held for releasing the pull cord.
Figure 17:
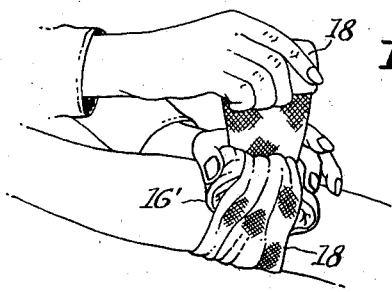
Figure 17 is a perspective view showing the manner in which the pressure dressing is retained on the wound by means of the wrapped dressing.

When applying the bandage the package is grasped in one hand, and with the free hand the wrapper is torn open. The bandage roll is then grasped and after removal from the protecting covering the pad or pillow portion of the dressing is placed firmly over the wound and held securely in place. While holding the dressing firmly to the wound, which is assumed to be in the arm, the long string holding the bandage roll is released and bandage 18 wrapped firmly and smoothly around the arm and tied with a split end in the usual manner thus anchoring the dressing pad in place, as shown in Figs. 15, 16 and 17.

For spurting wounds the dressing pad is left folded. The string holding the corners of the envelope is therefore not released.

For non-spurting wounds pull the second string 28 permitting the dressing to unfold.

For very large wounds the dressings may be placed side by side for complete coverage.

In conclusion it has been shown by extensive tests that the pressure dressing hereinabove described substantially eliminates edema from the wound area resulting from impaired blood circulation. The large pressure pad also serves to prevent mechanical spreading of infection and to alleviate pain. Moreover, the subject pressure dressing affords all of the advantages of a dampened sheep's-wool sea sponge with none of its disadvantages by providing sufficient depth of resilient material with ample firmness to press the injured blood vessels against the hard bony tissue lying underneath, using sufficient force to cause their collapse. The material in the sponge-like dressing, however, has enough resiliency to give with the natural force within the uninjured vessels, permitting circulation to continue in the uninjured vessels to tissues distal to the wound and into the tissues of the wound, so that the subject dressing not only affords pressure control of hemorrhage, but, as previously stated, is beneficial to the wound.

Having thus described my invention, what I claim as new and wish to secure by Letters Patent is:

1. A pressure dressing comprising an oblong gauze cover piece folded centrally upon itself to form a square front and rear panel, a plurality of gauze squares of equal dimensions stitched to three adjacent edges of said folded cover piece and the cover piece turned inside-out to form an envelope enclosing said squares, mechanics' waste inserted within said envelope intermediate said gauze squares and said front panel and retained therein by stitches along the fourth edge of said squares to form a dressing for large surface wounds, a rolled bandage attached at one end to the central portion of said rear panel, and a draw string threaded through the corners of said squares adapted to retain them centrally adjacent the attachment of said bandage to form a square pressure dressing of smaller wound coverage area than that of said front panel.

2. A pressure dressing of the character specified comprising a centrally folded sheet of gauze forming a cover, a plurality of sheets of coarse gauze stitched to said folded cover sheet adjacent one side thereof, and the cover sheet turned inside out to form an envelope provided with internal thicknesses of coarse gauze, a compressibly resilient padding packed between said cover sheet and the plurality of coarse gauze sheets, a bandage attached centrally to said outer cover sheet and rolled to form a handle, a releasable drawstring passing through the corners of said envelope adapted to retain them in folded position adjacent the attached end of said bandage, releasable means for retaining the rolled bandage in close proximity to the centrally retained corners of said envelope, and pull cords adapted to release said bandage from said folded dressing and for releasing the folded corners for enlarging the coverage area of the dressing while retaining a similar contour to that of said folded dressing.

3. A pressure dressing comprising a gauze cover piece folded upon itself to form similarly dimensioned front and rear panels, a plurality of gauze sheets corresponding in dimensions to said panels, said sheets being stitched to adjacent edges of said front and rear panels in a manner such that a portion of one of said adjacent edges will be left unstitched to form an opening whereby said cover piece when turned inside out provides an envelope open at one end and adapted to inclose said gauze sheets, mechanics' waste inserted through said opening and disposed within said envelope intermediate said gauze sheets and said front panel and retained therein by stitches along the unstitched edge of said panels which closes said opening and forms a dressing for large surface wounds, a rolled bandage attached at one end to the central portion of said rear panel and a drawstring threaded through the corners of said dressing and adapted to retain them centrally adjacent the attachment of said bandage to form a pressure dressing of smaller wound coverage area than would otherwise be provided by said front panel.

JOHN L. GALLAGHER.

REFERENCES CITED

The following references are of record in the file of this patent:

UNITED STATES PATENTS

| Number | Name | Date |
|---|---|---|
| 282,624 | Gamgee | Aug. 7, 1883 |
| 372,142 | Hall | Oct. 25, 1887 |
| 459,608 | Burnham | Sept. 15, 1891 |
| 917,694 | Wilson | Apr. 6, 1909 |
| 1,208,313 | Haydon | Dec. 12, 1916 |
| 1,284,143 | Reid | Nov. 5, 1918 |

FOREIGN PATENTS

| Number | Country | Date |
|---|---|---|
| 370,222 | France | Feb. 1, 1907 |
| 433,920 | France | Nov. 10, 1911 |
| 603,186 | France | Jan. 7, 1926 |